April 7, 1931.                P. C. KEITH, JR                1,799,626
                                HEAT EXCHANGER
                              Filed July 8, 1929

INVENTOR
Percy C. Keith Jr.
BY
ATTORNEY

Patented Apr. 7, 1931

1,799,626

UNITED STATES PATENT OFFICE

PERCY C. KEITH, JR., OF KANSAS CITY, MISSOURI, ASSIGNOR TO REFINERY ENGINEERS, INC., OF KANSAS CITY, MISSOURI, A CORPORATION OF MISSOURI

HEAT EXCHANGER

Application filed July 8, 1929. Serial No. 376,740.

My invention relates to heat exchangers, and methods for making the same, and more particularly to means for conducting hot and cold fluids along adjacent paths for transferring heat from one fluid to the other, the principal objects of the invention being to assure transfer of heat from hot to cold columns of liquid, to increase the heat-conductive relation between pipes carrying respectively a hot and a cold fluid, to support sets of pipes in conductive relation, and to facilitate the mounting of a heat exchanger in lines carrying hot and cold fluids.

Further objects of my invention are to minimize the hazards involved in transferring hot liquids under pressure in conductive relation with pipes carrying cold liquid, to reduce the number of parts necessary for effecting exchange of heat between two columns of fluid, and to provide a single unit adapted to be inserted in hot and cold liquid conduits for exchanging heat therebetween.

In accomplishing these and other objects of the invention, I have provided improved details of structure, the preferred forms of which are illustrated in the accompanying drawings, wherein.

Figure 1:
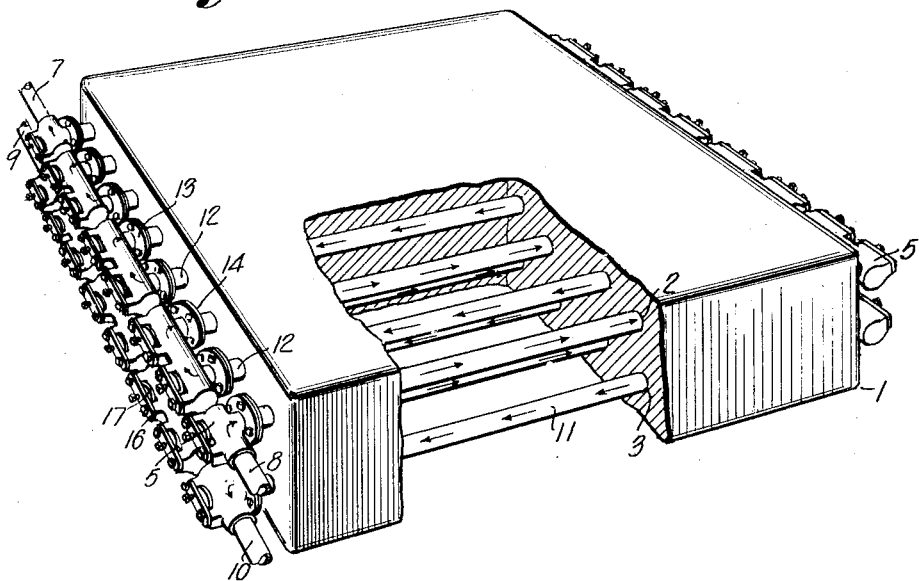
Fig. 1 is a perspective view of a heat exchanger constructed in accordance with my invention, the body thereof being partly broken away to better show construction, and connecting conduits being shown fragmentarily.

Referring in detail to the drawings:

1 designates a block preferably formed of metal such as cast iron or steel having the property of readily conducting heat, and provided with a plurality of sets of bores or channels 2 and 3 extending through the block.

The bores are formed to provide related ends of bores in the several sets at each end of the block for connecting bores by means of headers, couplings or the like whereby fluid may be delivered to the block and collected or received from the bores, for example tubular connectors 4 comprising return bends. The use of bends produces continuous tortuous conduits for columns of fluid through the block, one bore at each end of a series being unpaired and connected by couplings such as 5 with flow lines 7, 8, 9 and 10.

Pipes 11 are installed in the bores, having ends 12 projecting from the ends of the block to receive the header members or return bends 4. The branches of the bends preferably have flanges 13 for connection with flanges 14 on the pipes 11 whereby each pipe is provided with a separate and individual joint with a bend. The return bends are provided with apertures 15 coaxial with the pipes and closure devices 16 including disks 17 normally closing the apertures and adapted to be removed to afford access to the bends, pipes and bores for cleaning the same.

The bores are arranged in adjacent series, the bores in each series being illustrated as horizontally aligned, two series comprising respectively bores 2 and 3 being shown in the illustrated example of an exchanger. The pipes of the upper series may be connected with a flow line for hot fluid and the pipes of the other series may be connected with a flow line for cold fluid. When the bores of each series are adapted by provision of return bends to comprise continuous tortuous conduits, the end bores only are directly connected to the flow lines.

Attention is called to the arrows indicating the direction of flow of the fluids, the hot fluid in the illustrated application of the invention flowing in one direction, while the cold fluid flows in the opposite direction.

Each bore 3 of the second series is arranged in any desired relation with a bore 2 in the first series to effect exchange of heat between the fluids in the two series, and the bores may be spaced any desired distance since the contiguity of bores carrying fluids of different temperature is not required to effect heat exchange.

I further enhance the conductive property of the device by embedding the lining pipes in the block, and preferably by moulding or casting the block around the pipes so that cores are formed by the pipes, and the pipes are integrated with the material of the block.

Figure 3:
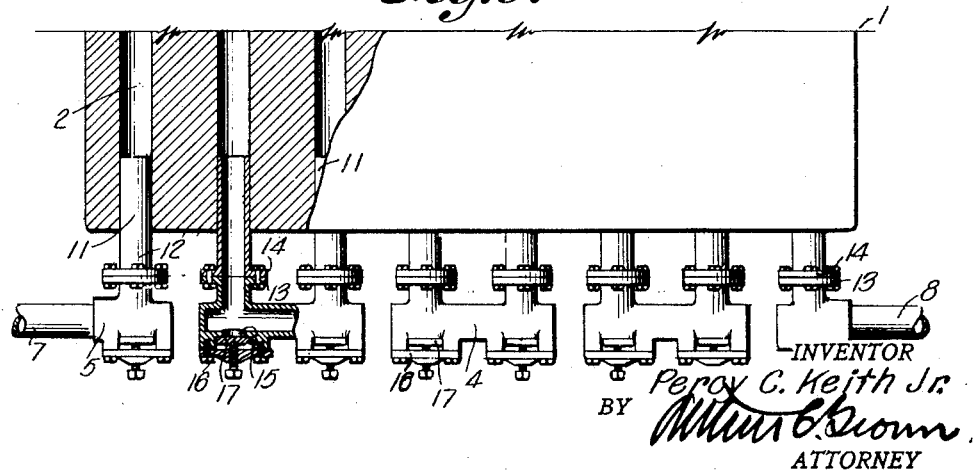
Fig. 3 is a top view partly in section illustrating the use of nipples extending in the bores.

In the form illustrated in Fig. 3, the pipes comprise nipples frozen or embedded in the outer ends of the bores and thus made substantially integral with the material of the block for promoting heat conduction between the block and a fluid in the pipe, the nipples being relatively short so that the major portion of a bore is unlined, and a fluid passes through the bore in direct contact with the block.

In using a heat exchanger constructed as described, hot fluid is delivered to one series of bores forming one continuous conduit and colder fluid to the other series. The heat is conducted through the metal body from the hot fluid to the cold fluid, the integrated character of the pipes due to the moulding of the metal of the block around the pipes promoting the transfer of heat, whereby the temperature of the hot fluid is reduced and the temperature of the cold fluid is increased.

Attention is particularly called to the substantial character of the channeled integral block, and the integration of the pipes or nipples with the block, whereby heat is efficiently and rapidly transferred from the fluid in each bore to the fluid in other bores, and hazard of explosion obviated.

The attachment of each pipe end separately to a head member by the flanged joints permits effective sealing of the joints, and the projection of the pipe ends from the block permits the application of the head members to the several pipe ends.

Figure 2:
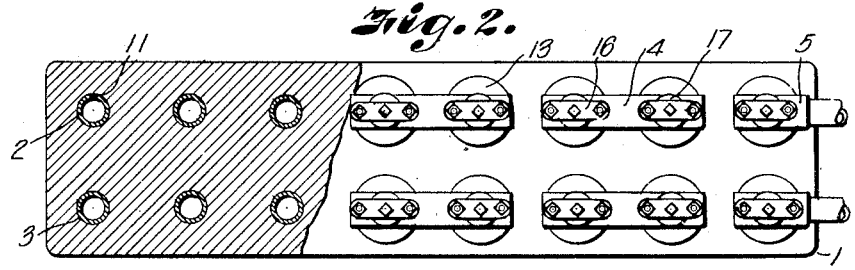
Fig. 2 is an end view of the exchanger, shown partly in section.

The process of forming the block includes the casting of metal around portions of the pipes, in the example illustrated in Fig. 1 the pipes being suitably supported and the metal cast around them as in usual casting procedure, the ends of the pipes projecting from the block so formed to provide nipples to receive headers. In the examples illustrated in Figs. 2 and 3, the casting operation is modified in any well known manner to provide the channels or bores and the metal is cast around the short pipes having projecting nipples.

What I claim and desire to secure by Letters Patent is:

1. In a heat exchanger, a block formed of metal, a plurality of parallel series of parallel pipes extending in the block, means connecting the pipes in each series to form separate adjacent continuous conduits, and inlets on opposite ends of said adjacent conduits.

2. In a heat exchanger, a block formed of metal and having a plurality of parallel bores, pipes extending into the bores and imbedded in the block, and means connecting selected pipes in series to form separate continuous conduits.

3. In combination with flow lines for hot and cold fluids respectively, a heat exchanger including a block having a plurality of parallel bores, means connecting adjacent ends of selected bores to form a pair of continuous conduits, and means for effecting movement of said fluids in opposite directions through the conduits including means for connecting the flow lines respectively to opposite ends of said conduits.

4. A heat exchanger including a block having a series of bores connected to form a conduit, inlet and outlet lines connected to the conduit, a second series of bores provided in said block, each adjacent and substantially parallel to one of said first named bores and connected to form a second conduit, and inlet and outlet lines connected to said second named conduit in reverse relation to the inlet and outlet lines of the first named conduit.

5. A heat exchanger including a series of pipes connected to form a conduit having an inlet end and an outlet end, a second conduit having inlet and outlet ends located respectively adjacent the outlet and inlet ends of the first named conduit and including a series of pipes located adjacent and parallel to the pipes of the first named series.

6. A heat exchanger including in combination with flow lines for hot and cold fluids respectively, a block having a plurality of substantially parallel series of bores including inlet and outlet bores at opposite ends of each of said series, means connecting adjacent ends of selected pairs of bores to form a pair of conduits respectively for hot and cold fluids, and means connecting said inlet and outlet bores with the flow lines for circulating said fluids in opposite directions through the conduits.

7. A heat exchanger including a block, a series of parallel pipes embedded in the block and connected to form a conduit having an inlet at one end of the block, a second series of parallel pipes embedded in the block adjacent the first named series and connected to form a conduit having an inlet at the opposite end of the block, and means for circulating fluids in opposite directions through the conduits.

In testimony whereof I affix my signature.

PERCY C. KEITH, Jr.